United States Patent [19]

Prehn

[11] 4,177,485
[45] Dec. 4, 1979

[54] FACSIMILE APPARATUS

[76] Inventor: Lawrence D. Prehn, 30 Old Glebe Rd., Arlington, Va.

[21] Appl. No.: 552,858

[22] Filed: Sep. 6, 1944

[51] Int. Cl.² ............................................. H04N 1/44
[52] U.S. Cl. ...................................... 358/259; 178/22; 358/264; 179/1.55
[58] Field of Search ............................ 179/1.5, 1.5, 15; 178/5.1, 22; 250/27 TR, 27 GT, 27 SW, 6

[56] References Cited

U.S. PATENT DOCUMENTS

| 2,086,798 | 7/1937 | Greenberg | 358/299 |
| 2,412,964 | 12/1946 | Chatterjea et al. | 179/1.5 M |
| 2,413,440 | 12/1946 | Farrington | 328/153 |
| 2,419,568 | 4/1947 | Labin | 179/1.5 M |
| 2,437,255 | 3/1948 | Hogan et al. | 35/4 |
| 2,448,814 | 9/1948 | Mann et al. | 209/570 |

Primary Examiner—S. C. Buczinski
Attorney, Agent, or Firm—John R. Utermohle

[57] EXEMPLARY CLAIM

1. In a facsimile apparatus, means for producing a stepped signal, the amplitudes of the steps being substantially dependent upon the photographic density of the subject and the durations of the steps being predetermined, a combining circuit and means for introducing the stepped signal thereto, means for introducing a coding signal to said combining circuit including a series of contacts and means for applying electrical potentials thereto, means for making successive circuits between the several contacts and the combining circuit, the durations of maintenance of the successive circuits being equal to the durations of the steps of the first mentioned signal, and means for synchronizing the circuit making means with the first mentioned signal.

8 Claims, 4 Drawing Figures

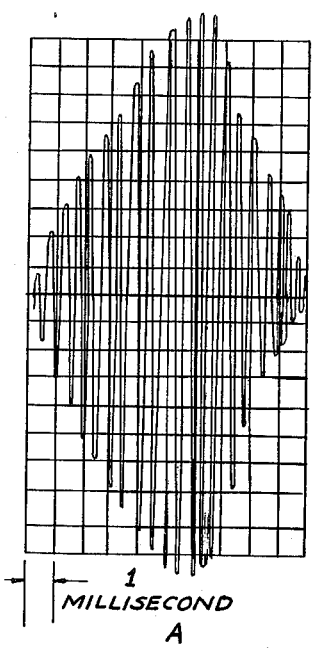
1 MILLISECOND
A
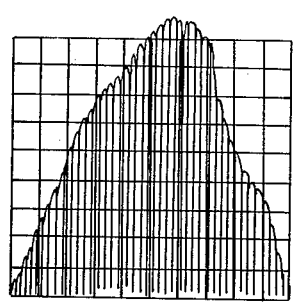
B
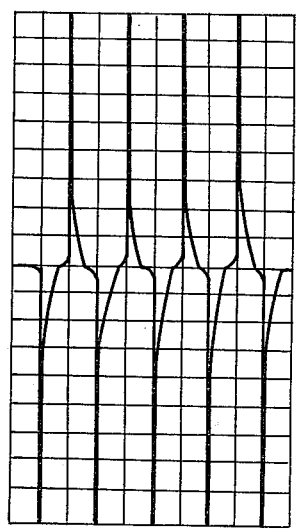
C
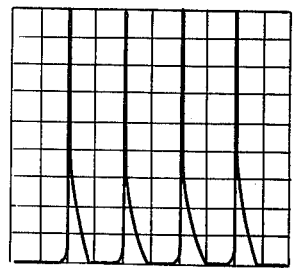
C'
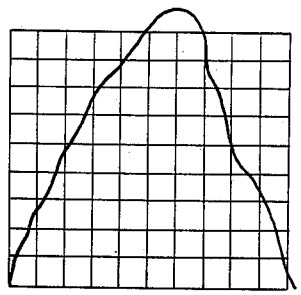
D
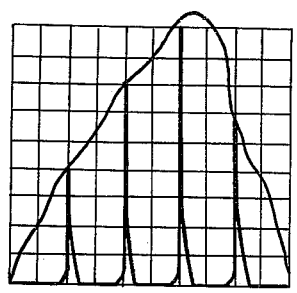
E
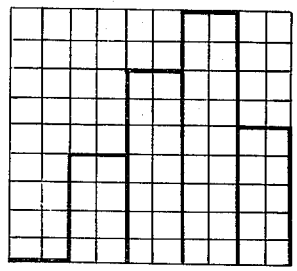
F
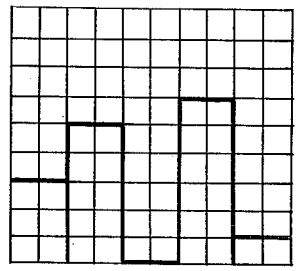
G
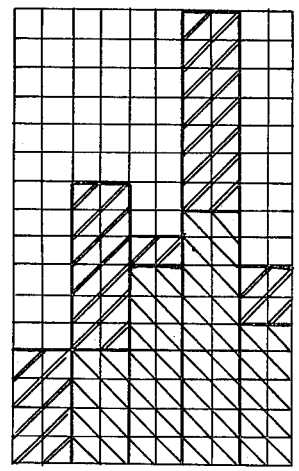
H
FIGURE 2

FACSIMILE APPARATUS

This invention is in secret communications equipment, particularly facsimile transmission systems. Specifically, it comprises an improved method and apparatus for so treating a facsimile signal derived from a multi-tone picture as to make the signal unintelligible except to a person having a proper apparatus, properly adjusted. Otherwise, the received signal will not produce a legible facsimile of the original picture, map or other document but, instead, merely an apparently random arrangement of picture elements of various photographic densities.

Facsimile signals are just as liable to interception as are other forms of electrical communications. It has, therefore, become necessary, particularly in connection with military traffic, to devise means for "scrambling" or confusing facsimile signals. Various systems have already been developed for this purpose.

Although the invention is specifically adapted for the encryptment of facsimile signals, it is to be understood that it can treat as well many other types of signals. This will be apparent from the description to follow.

One object of this invention is to provide an improved method and apparatus for encrypting communications signals.

Another object is to provide an improved electrical method and apparatus for encrypting a multi-tone picture, map or other subject.

A further object is to provide an improved method and apparatus for encrypting amplitude-modulated communication signals by treating individually preselected amplitude components thereof.

An additional object of the invention is to provide novel means and apparatus for reducing an amplitude-modulated signal to an analogous stepped signal and for individually encrypting the several steps thereof.

Other objects will appear from a reading of the following description and claims.

In the drawings:

FIG. 2 illustrates the action of the invention upon an electrical signal;

The normal signal output of a telephoto or other facsimile pick-up is a tone or signal, the amplitude of which at a particular instant is proportional to the photographic density of the subject at the point being scanned. In order to facilitate transmission by radio means and for some other reasons, it is customary to convert the amplitude-modulated signal to an analogous frequency-modulated signal.

Figure 1:
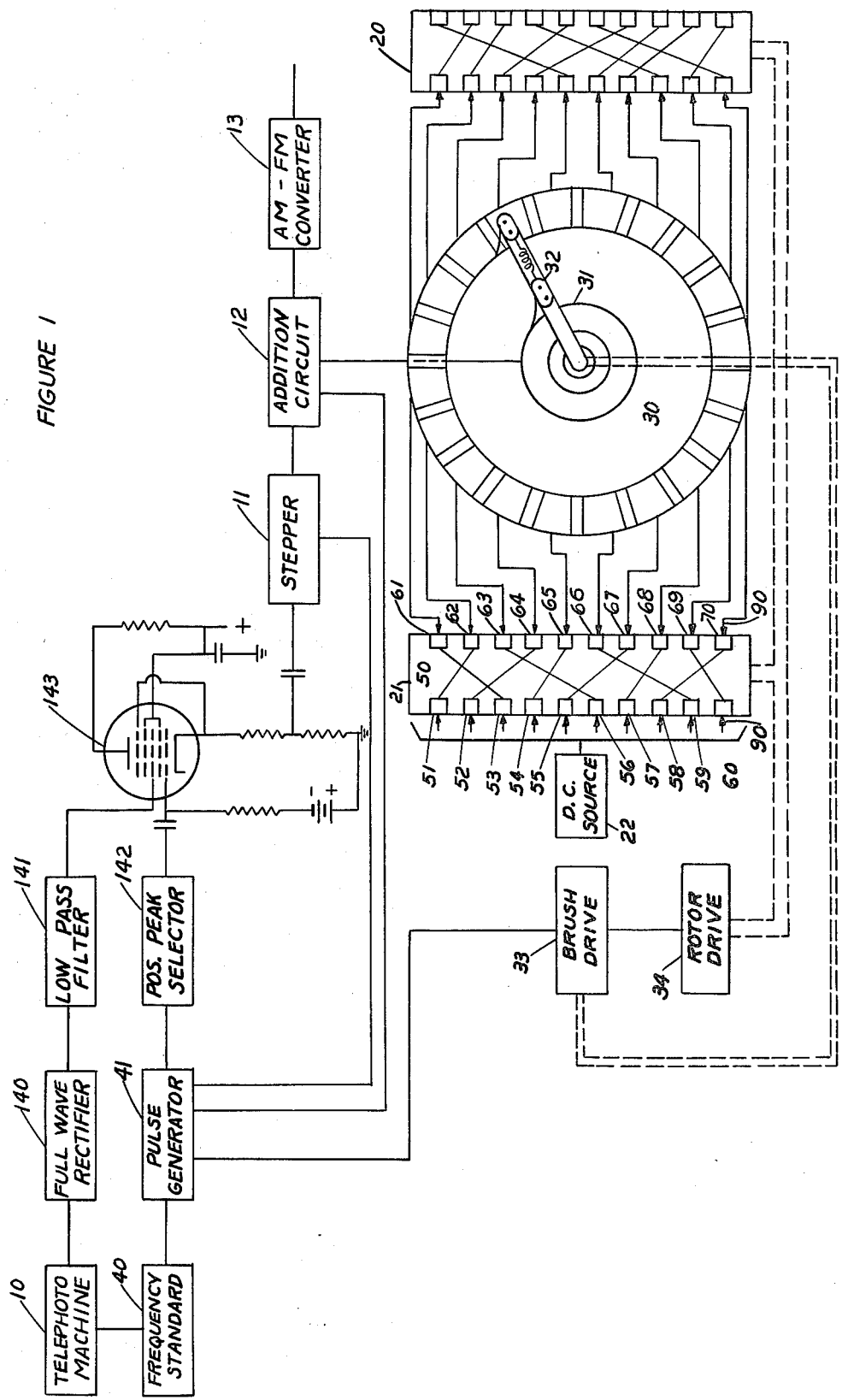
FIG. 1 is a schematic diagram of the essential features of the invention.

Referring to FIG. 1, 10 is a wirephoto or telephoto machine of any desired type. The output of machine 10 will be assumed herein to be a two thousand cycle per second carrier current amplitude-modulated in accordance with the picture density. Disregarding for the moment certain other apparatus shown in the block diagram, the output of the telephoto machine is introduced to a stepping circuit 11, the function of which is to convert the undulating facsimile signal (FIG. 2, D) to a signal having the characteristics shown in FIG. 2, at F. Stepping circuit 11 may be adapted to trip at as many levels as desired, but a ten-level circuit will be described. The time relationships between the steps provided by circuit 11 also may be varied as desired, but herein the duration of each step will be assumed to be two milliseconds. The stepped output of circuit 11 is next introduced to a addition circuit 12 along with a coding signal which contains a maximum of ten steps, each likewise of a duration of two milliseconds. The production of the coding signal will be further described in detail below. It is sufficient here to say that the values of the successive steps of the coding signal vary in a predetermined order not necessarily related to the steps of the intelligence signal. Each step, however, will be equivalent in value to one of the ten output levels of stepping circuit 11. The encrypted amplitude-modulated output of adding circuit 12 is next converted at 13 into some form of frequency-modulated signal and transmitted in a normal way.

Two similar permuting elements or scramblers, 20 and 21, are utilized. With reference to permuter 21, it is in the nature of a cryptographic rotor comprising a body member or rotor proper, 50', ten input contacts, 51' through 60', and ten output contacts, 61' through 70'. No input contact is connected to its corresponding output contact, but, instead, connections are made substantially at random. Preferably, all contacts are flush with the surface of member 50' and brushes, indicated at 90, are arranged to cooperate therewith. From time to time element 21 is rotated one or more steps (a step representing the distance between adjacent contacts), the result being that all input brushes are then connected to different output contacts than originally.

Various types of rotors or other permuting devices may be used. Obviously, a plurality of such devices can be used in series and in this case they are preferably stepped or otherwise varied in meter fashion. This is well covered in prior art disclosures.

Each of the inputs 51' through 60' is adapted to be maintained by a battery or other source 22 at a potential corresponding to one of the steps of stepping circuit 11, and the various preselected voltages are likewise maintained on the input contacts of rotor 20 by similar means (not shown). Voltages on the input contacts of the permuting elements, after scrambling, are introduced individually to contact segments arranged around the periphery of a distributor, 30, which is provided also with a continuous contact ring 31 and a rotating brush member 32, the functions of which are apparent.

A synchronizing signal for the apparatus must be provided. As illustrated in FIG. 1, the signal is obtained from a source, 40, of any desired type supplying a constant frequency. Obviously, a synchronizing signal can be obtained from outside the system. In the preferred embodiment of the invention, the synchronizing signal serves to time the pulses of a generator 41 so that said pulses occur at intervals of two milliseconds. The pulses then time the tripping of stepping circuit 11 and likewise the tripping of the adding circuit 12. Further, the pulses synchronize the driving mechanism 33 for brush 32 so that the brush will make exactly one-half a revolution in twenty milliseconds, ie., it will sweep one contact segment each two milliseconds, and, still further, the pulses are utilized to time and control through motor 34 predetermined variations in permuting elements 20 and 21 alternately.

Assume that a picture, including portions of black and white and eight intermediate shades or tones, is to be transmitted. The picture is put in place on a drum in the usual fashion. The normal output of pick-up device 10 will be an amplitude-modulated 2000 cycle current. A small portion of the envelope of such a signal is shown in FIG. 2, at D.

At two-millisecond intervals, as explained, stepping circuit 11 will trip, and its output will assume for two milliseconds a value approximating the value of its input at the instant of tripping (see FIG. 2, F). The values of the stepped signal are approximate only, because the circuit producing them has but ten possible output levels. In practice, when the input signal fails to correspond exactly with any one of the pre-arranged values of the stepping circuit at the instant of tripping, the stepping circuit will assume a value immediately below the value of the input signal.

If brush 32 is rotated, it will furnish to the adding circuit 12 a pulse, the duration of which is two milliseconds and the voltage of which is the same as one of the tripping levels of stepping circuit 11. As shown in FIG. 1, brush 32 is in contact with the third segment. With reference to FIG. 2, G (which represents a portion of coding signal), it will be seen that the voltage on the third contact segment is represented at a particular moment as being at level 1 of the ten possible levels. At the same moment the intelligence signal (F) is at the eighth level. These two voltage pulses, properly synchronized by means of pulse generator 41, are introduced to the adding circuit 12 where they are added to produce a two-millisecond output at level 9 (FIG. 2, H). The "subtraction" of the coding signal from the transmitted signal will produce the equivalent of the intelligence signal.

As soon as the brush has completed one-half of a revolution and thus has swept the first ten contact segments of distributor 30, the second permuting element 21 is brought into use. At about the same instant, timed by the pulses from generator 41, permuting element 20 steps or in some other fashion the code for the right side of the distributor 30 is changed. This process is continued, the permuting elements being used alternately and being modified in any desired fashion while not in use.

An electronic distributor may, of course, be substituted for the mechanical means 30–32 of FIG. 1.

Figure 3:
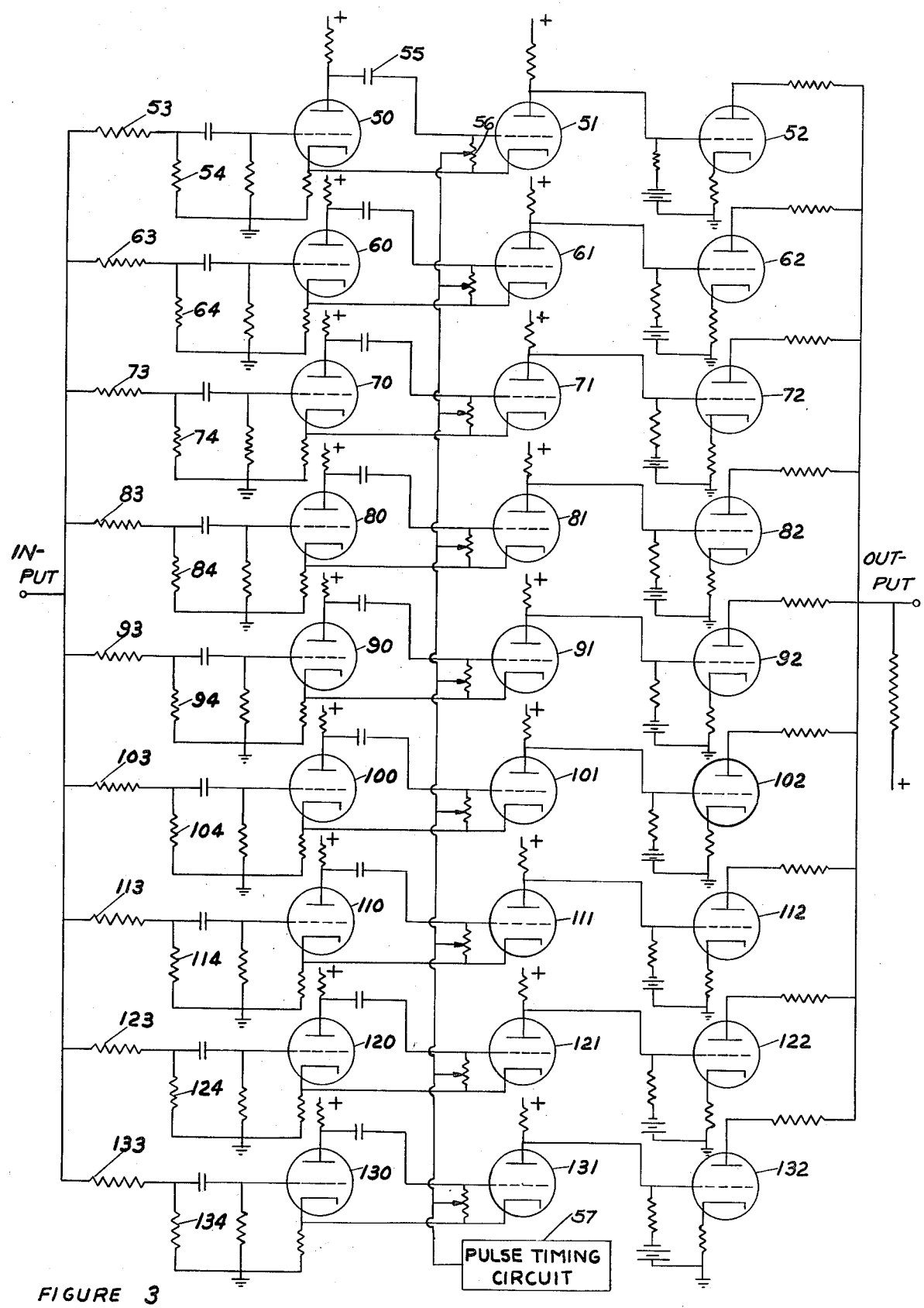
FIG. 3 is a schematic illustration of a novel stepping circuit suitable for use with the invention.

A ten-level stepping circuit providing the rapid action desired in this invention is illustrated in FIG. 3. Vacuum tubes only are used. The circuit is composed of nine multivibrator or flip-flop units 50–51, 60–61, 70–71, 80–81, 90–91, 100–101, 110–111, 120–121 and 130–131, each with an associated buffer stage 52, 62, 72, 82, 92, 102, 112, 122 and 132.

With the exception of resistors 53, 63, 73, 83, 93, 103, 113, 123 and 133, all corresponding components of the multivibrator and buffer circuits are identical in value. The resistors mentioned are graduated in value, and these determine the tripping levels of the circuit. The absolute values of resistors 53, 63, 73, 83, 93, 103, 113, 123 and 133 are, therefore, a matter of choice. In FIG. 3, 53 is the largest and 133 is the smallest.

The output of pick-up 10 is applied simultaneously across resistors 53, 63, 73, 83, 93, 103, 113, 123, and 133 which, together with their respective resistors 54, 64, 74, 84, 94, 104, 114, 124 and 134, act as voltage dividers. The voltage across resistor 54, therefore, will be the smallest and that across 134 will be the largest.

In the flip-flop circuit 50–51 at no signal, tube 50 is biased to cut-off and tube 51 has a zero bias and will conduct. If a pulse of sufficient amplitude is applied to the input, tube 50 conducts, and 51 is extinguished. The time required for tube 50 to cut-off depends upon the time constant of the capacity-resistance coupling 55–56. The discharges of condenser 55 and those corresponding to it in the other multivibrator circuits are controlled by means of pulses from timing circuit 57 (not shown as an element in FIG. 1 but assumed to be a part of pulse generator 41 there shown) in order to assure that all tubes of the group 50–130 cut-off simultaneously. The outputs of tubes 51, 61, 71, 81, 91, 101, 111, 121 and 131 are direct-coupled to their respective buffer stages.

In operation a signal of, for example, one-tenth maximum amplitude will develop a voltage across resistor 134 sufficient to overcome the cut-off bias on the tube 130 but not sufficient to cause any other tube of the group 50, 60, 70, 80, 90, 100, 110, 120 and 130 to conduct. A signal of, for example, three-tenths maximum amplitude will cause tubes 130, 120 and 110 to conduct. In other words, as the signal amplitude increases, more tubes conduct so that at or above the maximum amplitude intended to be handled all tubes of the group 50, 60, 70, 80, 90, 100, 110, 120 and 130 will conduct.

As any of the tubes 51 though 131 is extinguished, its plate voltage becomes more positive, and this voltage, applied to a buffer tube input, causes the buffer to conduct.

Under ideal conditions the stepping circuit will function as just described. With only the apparatus described, however, and with conditions normal rather than ideal, a tube of the group 50, 60, 70, 80, 90, 100, 110, 120 and 130 may not fire until after an appreciable "build-up" interval. Since a very precise tripping of the stepping circuit at two millisecond intervals is desired, means are, therefore, preferably supplied to furnish the stepping circuit with a signal formed of steep wave fronts which will produce substantially instantaneous excitation of the tubes.

The output of telephoto machine 10 is represented in diagram in FIG. 2, at A. A 2000-cycle carrier is indicated. It will be assumed herein that the envelope modulation frequency does not exceed 500 cycles, that is, it will fall between 0 and 500 cycles per second. The signal is introduced to a full-wave rectifier 140, thereby to produce the wave form of FIG. 2, B, and then through a low-pass filter 141 having a cut-off near 500 cycles, for example, 550–600.

At the same time under the control of frequency standard 40, a series of positive and negative pulses are developed in pulse generator 41 with a frequency of exactly 500 cycles per second (see FIG. 2, at C). The negative pulses are eliminated by the positive pulse selector 142, and the positive pulses (see FIG. 2, at C'), recurring 500 times per second, are used with the output of filter 141 in pulse peak modulator 143 to produce a series of pulses of varying magnitudes and constant frequency. These (shown in FIG. 2, at E) actually control the stepping circuit.

Figure 4:
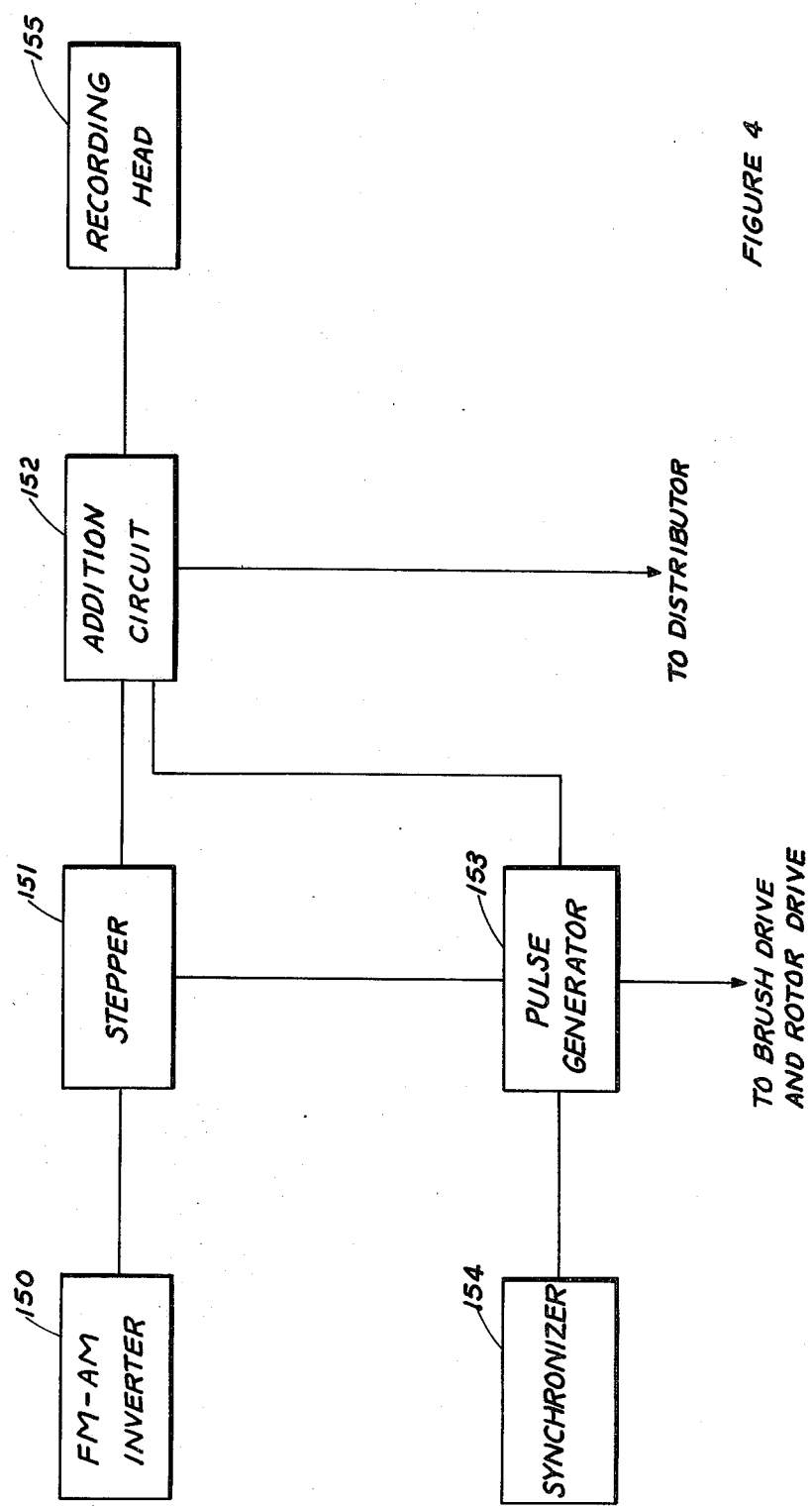
FIG. 4 is a block diagram of a portion of the receiving apparatus.

The receiving apparatus of FIG. 4 is in all essential respects like the transmitting apparatus of FIG. 1. The distributor and permuting elements are not shown. No elements corresponding to rectifier 140, filter 141, and positive peak selector 142 of FIG. 1 are necessary. In operation, the received signal is first reconverted into amplitude-modulated form at 150 and then put through a stepping circuit 151 like that utilized in the transmitting operation. Under some circumstances this latter operation may be omitted, but, as is known, signals of the nature involved normally deteriorate during transmission, and it will usually be found advantageous to correct them before further treatment. Depending upon conditions, also, it may be desirable to "reshape" the received signal before introduction to the stepping circuit so that accurate stepping can be assured. The encrypted signal, corrected, is next combined, at 152, with a coding signal identical with that employed at the transmitting station, the end result being a signal substantially like the intelligence signal diagramed in FIG. 2, at F. The stepped signal may be applied directly to the recording head, 155, or may be passed through a low-pass filter to smooth the sharp step transitions, depending upon the type of recorder used.

Pulse generator 153 and frequency standard device 154 serve the same purposes as the similar elements of FIG. 1, there numbered 41 and 40, respectively. A synchronizing signal can be transmitted with the facsimile signal if desired.

The above description is in specific terms. It should be understood, however, that the invention is not limited to the exact embodiment shown and described, but, instead, includes such modifications and equivalents as fall properly within the scope of the appended claims.

I claim:

1. In a facsimile apparatus, means for producing a stepped signal, the amplitudes of the steps being substantially dependent upon the photographic density of the subject and the durations of the steps being predetermined, a combining circuit and means for introducing the stepped signal thereto, means for introducing a coding signal to said combining circuit including a series of contacts and means for applying electrical potentials thereto, means for making successive circuits between the several contacts and the combining circuit, the durations of maintenance of the successive circuits being equal to the durations of the steps of the first mentioned signal, and means for synchronizing the circuit making means with the first mentioned signal.

2. In a facsimile apparatus, means for producing a stepped signal, the amplitudes of the steps being substantially dependent upon the photographic density of the subject and the durations of the steps being predetermined, a combining circuit and means for introducing the stepped signal thereto, means for introducing a coding signal to said combining circuit including a series of contacts and means for applying electrical potentials thereto, means for making successive circuits between the several contacts and the combining circuit, the durations of maintenance of the successive circuits being equal to the durations of the steps of the first mentioned signal, means for synchronizing the circuit making means with the first mentioned signal, and means for intermittently varying the potentials on said contacts.

3. In a facsimile apparatus, means for producing a stepped signal, the amplitudes of the steps being substantially dependent upon the photographic density of the subject and the durations of the steps being predetermined, a combining circuit and means for introducing the stepped signal thereto, means for introducing a coding signal to said combining circuit including a series of contacts and means for applying electrical potentials thereto, a brush adapted to sweep said contacts and to establish successive circuits between the several contacts and the combining circuit, the durations of maintenance of the successive circuits being equal to the durations of the steps of the first mentioned signal, means for synchronizing the rotation of the brush with the first mentioned signal, a second series of contacts adapted to be swept after the said first series, and means actuated upon the completion of the sweep of one of said series for varying the potentials of the contacts thereof.

4. In a facsimile apparatus, means for producing a stepped signal, the amplitudes of the steps being substantially dependent upon the photographic density of the subject and the durations of the steps being predetermined, a combining circuit and means for introducing the stepped signal thereto, means for introducing a coding signal to said combining circuit including a series of contacts and means for applying electrical potentials thereto, means for making successive circuits between the several contacts and the combining circuit, the durations of maintenance of the successive circuits being equal to the durations of the steps of the first mentioned signal, means for synchronizing the circuit making means with the first mentioned signal, a second combining circuit with means for introducing thereto the output of the first mentioned combining circuit and a decoding signal, and a recording head or the like.

5. In a facsimile apparatus, means for producing a stepped signal, the amplitudes of the steps being substantially dependent upon the photographic density of the subject and the durations of the steps being predetermined, a combining circuit and means for introducing the stepped signal thereto, means for introducing a coding signal to said combining circuit including a series of contacts and means for applying electrical potentials thereto, means for making successive circuits between the several contacts and the combining circuit, the durations of maintenance of the successive circuits being equal to the durations of the steps of the first mentioned signal, means for synchronizing the circuit making means with the first mentioned signal, means for intermittently varying the potentials on said contacts, a second combining circuit with means for introducing thereto a decoding signal and the output of the first mentioned combining circuit, and a recording head or the like.

6. In a facsimile apparatus, means for producing a stepped signal, the amplitudes of the steps being substantially dependent upon the photographic density of the subject and the durations of the steps being predetermined, a combining circuit and means for introducing the stepped signal thereto, means for introducng a coding signal to said combining circuit including a series of contacts and means for applying electrical potentials thereto, a brush adapted to sweep said contacts and to establish successive circuits between the several contacts and the combining circuit, the durations of maintenance of the successive circuits being equal to the durations of the steps of the first mentioned signal, means for synchronizing the rotation of the brush with the first mentioned signal, means for intermittently varying the potentials on said contacts, a second series of contacts adapted to be swept after the said first series, means actuated upon the completion of the sweep of one of said series for varying the potentials of the contacts thereof, and a second combining circuit with means for introducing thereto a decoding signal and the output of the first mentioned combining circuit, and a recording head or the like.

7. In a facsimile system, a pick-up or the like, a stepping circuit adapted to receive the output of said pick-up and to convert the same to a signal comprising steps of predetermined durations and amplitudes substantially determined by the instantaneous photographic density of a subject, means for producing a coding signal comprising steps equal in duration to the steps of the first mentioned signal and of varying amplitudes, means for synchronizing the successive steps of two signals, a combining circuit adapted to receive the synchronized signals and to combine them according to a predetermined rule, a converter adapted to receive the output of the additive circuit and to produce a frequency-modulated signal equivalent thereto, an inverter for producing an amplitude-modulated signal equivalent to said frequency-modulated signal, means for producing a decoding signal, a second combining circuit, means for introducing the output of said inverter and said decoding signal to said second combining circuit, and a recording head or the like.

8. In a facsimile system, a pick-up for scanning a subject to be transmitted, a stepping circuit for receiving the output of said pick-up and for converting the same to a signal comprising steps of predetermined durations and amplitudes substantially determined by the photographic density of the subject at successive instants, an adding circuit, a plurality of brushes, means for maintaining said brushes at potentials selected out of a plurality of predetermined potentials, means for completing circuits successively between the said additive circuit and the said brushes, each of the last mentioned circuits being maintained for the duration of a step of the first mentioned signal, means for varying the order in which the circuits between the brushes and the additive circuit are completed, and means for synchronizing the stepping circuit and the said circuit completing means.

* * * * *